US009891932B2

United States Patent
Yu (10) Patent No.: US 9,891,932 B2
(45) Date of Patent: *Feb. 13, 2018

(54) TOUCH-SENSITIVE REMOTE CONTROL WITH VISUAL FEEDBACK (71) Applicant: EVA Automation, Inc., Redwood City, CA (US)

(72) Inventor: Gaylord Yu, San Francisco, CA (US)

(73) Assignee: Eva Automation, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/706,745

(22) Filed: Sep. 17, 2017

(65) Prior Publication Data

US 2018/0004548 A1 Jan. 4, 2018

Related U.S. Application Data (63) Continuation of application No. 14/851,398, filed on Sep. 11, 2015.

(51) Int. Cl.
*H04N 5/44* (2011.01)
*G06F 9/44* (2006.01)
(Continued)

(52) U.S. Cl.
CPC ........ *G06F 9/4446* (2013.01); *G06F 3/04817* (2013.01); *G06F 3/04883* (2013.01);
(Continued)

(58) Field of Classification Search
CPC .......... H04N 5/45; H04N 5/44; H04N 5/4403; H04N 2005/4425; H04N 2005/443;
(Continued)

(56) References Cited

U.S. PATENT DOCUMENTS 8,972,533 B1 * 3/2015 Roka ................. H04L 67/36
348/734
9,239,837 B2 1/2016 Chardon ........... G06F 17/30011
(Continued)

OTHER PUBLICATIONS

International Search Report and Written Opinion for PCT/US2016/051195 dated Nov. 17, 2016.
(Continued)

*Primary Examiner* — Trang U Tran
(74) *Attorney, Agent, or Firm* — Steven Stupp (57) ABSTRACT An audio/video (A/V) hub provides feedback to a user of a portable electronic device with a touch-sensitive display (such as a cellular telephone) that is used as a wireless remote control for an audio/video (A/V) display device, the A/V hub and/or a consumer-electronic device. In particular, when the A/V hub receives, from the portable electronic device, user-interface activity information associated with a user interface displayed on a touch-sensitive display, the A/V hub generates visual feedback based on the user-interface activity information. Then, the A/V hub provides the visual feedback to the A/V display device for display on the A/V display device. The visual feedback indicates a position of at least a touch contact point of a user of the portable electronic device relative to a strike area of at least a virtual command icon in the user interface.

20 Claims, 5 Drawing Sheets

(51) Int. Cl.
 *G06F 3/0481* (2013.01)
 *G06F 3/0489* (2013.01)
 *G06F 3/0488* (2013.01)
 *H04N 5/45* (2011.01)
 *H04N 5/445* (2011.01)

(52) U.S. Cl.
 CPC ....... *G06F 3/04897* (2013.01); *H04N 5/4403* (2013.01); *H04N 5/45* (2013.01); *H04N 2005/443* (2013.01); *H04N 2005/4425* (2013.01); *H04N 2005/44586* (2013.01)

(58) Field of Classification Search
 CPC ............... G06F 9/4446; G06F 3/04817; G06F 3/04883; G06F 3/04897
 USPC ...... 348/734, 565, 563, 564; 340/12.26, 1.1, 340/825.22
 See application file for complete search history.

(56) References Cited

U.S. PATENT DOCUMENTS

| | | | | |
|---|---|---|---|---|
| 9,264,753 B2* | 2/2016 | Xu | ................... | H04N 21/42224 |
| 9,798,554 B2* | 10/2017 | Yu | ......................... | G06F 9/4446 |
| 2005/0249486 A1 | 10/2005 | Murray | ........................... | 396/56 |
| 2007/0152980 A1 | 5/2007 | Kocienda | ...................... | 345/173 |
| 2012/0277000 A1 | 1/2012 | Vange | .............................. | 463/37 |
| 2015/0195603 A1 | 9/2015 | McDevitt | ...................... | 725/109 |

OTHER PUBLICATIONS

Office Action for U.S. Appl. No. 14/851,398, dated Oct. 20, 2016.
Response to Office Action for U.S. Appl. No. 14/851,398, dated Jan. 20, 2017.

Office Action for U.S. Appl. No. 14/851,398, dated Apr. 19, 2017.
Response to Office Action for U.S. Appl. No. 14/851,398, dated May 9, 2017.

Office Action for U.S. Appl. No. 14/851,398, dated Jun. 1, 2017.
Response to Office Action for U.S. Appl. No. 14/851,398, dated Jun. 10, 2017.

\* cited by examiner

TOUCH-SENSITIVE REMOTE CONTROL WITH VISUAL FEEDBACK

CROSS REFERENCE TO RELATED APPLICATIONS

This application claims priority under 35 U.S.C. 120 as a Continuation of U.S. patent application Ser. No. 14/851,398, entitled "Touch-Sensitive Remote Control with Visual Feedback," by Gaylord Yu, filed Sep. 11, 2015, the contents of which are herein incorporated by reference.

BACKGROUND

Field

The described embodiments relate to techniques for providing feedback to a user of a portable electronic device, including providing visual feedback to a user about their interaction with a user interface on a touch-sensitive display in a portable electronic device.

Related Art

The versatility and capabilities of portable electronic devices is increasing their popularity. For example, many portable electronic devices includes touch-sensitive displays that allow users to dynamically interact with the portable electronic devices. In addition, many portable electronic devices can wirelessly communicate with other electronic devices, which allow the portable electronic devices to rapidly and conveniently communicate information. In particular, the portable electronic devices may include networking subsystem that implement a network interface, such as: a wireless network described in the Institute of Electrical and Electronics Engineers (IEEE) 802.11 standard, Bluetooth® (from the Bluetooth Special Interest Group of Kirkland, Wash.), and/or another type of wireless network. The combination of a user interface on a touch-sensitive display and wireless-communication capability can allow users to use portable electronic devices to remotely control another electronic device.

However, it can be difficult to use a user interface on a touch-sensitive display. For example, many touch-sensitive displays do not provide tactile or non-visual sensory feedback to a user of a portable electronic device. Consequently, the user may need to look at or directly view the user interface on the touch-sensitive displays in order to correctly activate a strike area of a given virtual icon in the user interface. When this is not possible, the user may make errors, such as activating the wrong strike area or missing a desired strike area. These errors will frustrate users, which can degrade the user experience.

SUMMARY

The described embodiments include an audio/video (A/V) hub. This A/V hub includes: an antenna; an interface circuit, coupled to the antenna, which communicates with a portable electronic device; and a control circuit coupled to the interface circuit. During operation, the control circuit receives, via the interface circuit, user-interface activity information from the portable electronic device, where the user-interface activity information is associated with a user interface displayed on a touch-sensitive display in the portable electronic device, and the user interface is used to control an A/V display device, the A/V hub and/or a consumer-electronic device, which is other than the portable electronic device. Then, the control circuit generates visual feedback based on the user-interface activity information.

Next, the control circuit provides the visual feedback to the A/V display device for display on a display in the A/V display device, where the visual feedback indicates a position of at least a touch contact point of a user of the portable electronic device relative to a strike area of at least a virtual command icon in the user interface. (In some embodiments, the control circuit displays the visual feedback on the display.)

Moreover, the interface circuit may communicate with the A/V display device. Furthermore, the A/V hub may include a second interface circuit, coupled to the processor, which can couple to the A/V display device. For example, the A/V hub may include a port, coupled to the second interface circuit, which is compatible with a high-definition multimedia-interface (HDMI) standard, and the A/V hub may couple to the A/V display device via the port.

Additionally, the visual feedback may be displayed on the display along with A/V content. Note that the visual feedback may be superimposed on the A/V content, and the visual feedback may be partially transparent so that the A/V content is visible underneath the visual feedback when displayed on the A/V display device.

In some embodiments, the control circuit: generates the A/V content; and provides the A/V content to the A/V display device.

Note that the A/V display device may include a television. Moreover, the portable electronic device may include a cellular telephone that functions as a remote control.

Furthermore, at least the touch contact point of the user is ongoing (i.e., the user may maintain contact with the touch-sensitive display).

Additionally, the user-interface activity information may specify activation of at least the virtual command icon based on the user releasing at least the touch contact point within the strike area.

In some embodiments, the control circuit includes: a processor coupled to the interface circuit; and a memory, coupled to the processor, which stores a program module that is executed by the processor. The program module may include instructions for: the receiving; the generating; and the providing.

Another embodiment provides a computer-program product for use with the A/V hub. This computer-program product includes instructions for at least some of the operations performed by the A/V hub.

Another embodiment provides a method for providing visual feedback. This method includes at least some of the operations performed by the A/V hub.

Another embodiment provides the portable electronic device.

Another embodiment provides a second computer-program product for use with the portable electronic device. The second computer-program product includes instructions for at least some of the operations performed by the portable electronic device.

Another embodiment provides a method for providing user-activity information. This method includes at least some of the operations performed by the portable electronic device.

This Summary is provided merely for purposes of illustrating some exemplary embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

An audio/video (A/V) hub provides feedback to a user of a portable electronic device with a touch-sensitive display (such as a cellular telephone) that is used as a wireless remote control for an A/V display device, the A/V hub and/or a consumer-electronic device. In particular, when the A/V hub receives, from the portable electronic device, user-interface activity information associated with a user interface displayed on a touch-sensitive display, the A/V hub generates visual feedback based on the user-interface activity information. Then, the A/V hub provides the visual feedback to the A/V display device for display on the A/V display device. The visual feedback indicates a position of at least a touch contact point of a user of the portable electronic device relative to a strike area of at least a virtual command icon in the user interface.

By providing the visual feedback, this feedback technique facilitates intuitive use of the user interface displayed on the touch-sensitive display. In particular, even when the user is not directly looking at the user interface displayed on the touch-sensitive display, the visual feedback allows the user to navigate through and use the user interface (i.e., the visual feedback provides spatial situation awareness to the user). This capability allows the user to effectively use the user interface to control the A/V hub, the A/V display device and/or the consumer-electronic device with fewer errors or mistakes, even when the user interface is obstructed (such as when the portable electronic device is under a blanket) or when lighting conditions are poor, and even though there may not be tactile or haptic clues provided on a surface of the user interface to guide the user's touch-contact point to the strike area. Consequently, the feedback technique may improve the user experience when using the portable electronic device, the A/V hub and the A/V display device.

In the discussion that follows the portable electronic device, the A/V hub and/or the A/V display device may include radios that communicate packets or frames in accordance with one or more communication protocols, such as: an Institute of Electrical and Electronics Engineers (IEEE) 802.11 standard (which is sometimes referred to as 'Wi-Fi®,' from the Wi-Fi® Alliance of Austin, Tex.), Bluetooth® (from the Bluetooth Special Interest Group of Kirkland, Wash.), a cellular-telephone communication protocol, a near-field-communication standard or specification (from the NFC Forum of Wakefield, Mass.), and/or another type of wireless interface. In the discussion that follows, Wi-Fi is used as an illustrative example. For example, the cellular-telephone communication protocol may include or may be compatible with: a $2^{nd}$ generation of mobile telecommunication technology, a $3^{rd}$ generation of mobile telecommunications technology (such as a communication protocol that complies with the International Mobile Telecommunications-2000 specifications by the International Telecommunication Union of Geneva, Switzerland), a $4^{th}$ generation of mobile telecommunications technology (such as a communication protocol that complies with the International Mobile Telecommunications Advanced specification by the International Telecommunication Union of Geneva, Switzerland), and/or another cellular-telephone communication technique. In some embodiments, the communication protocol includes Long Term Evolution or LTE. However, a wide variety of communication protocols may be used. In addition, the communication may occur via a wide variety of frequency bands. Note that the portable electronic device, the A/V hub and/or the A/V display device may communicate using infra-red communication that is compatible with an infra-red communication standard.

Figure 1:
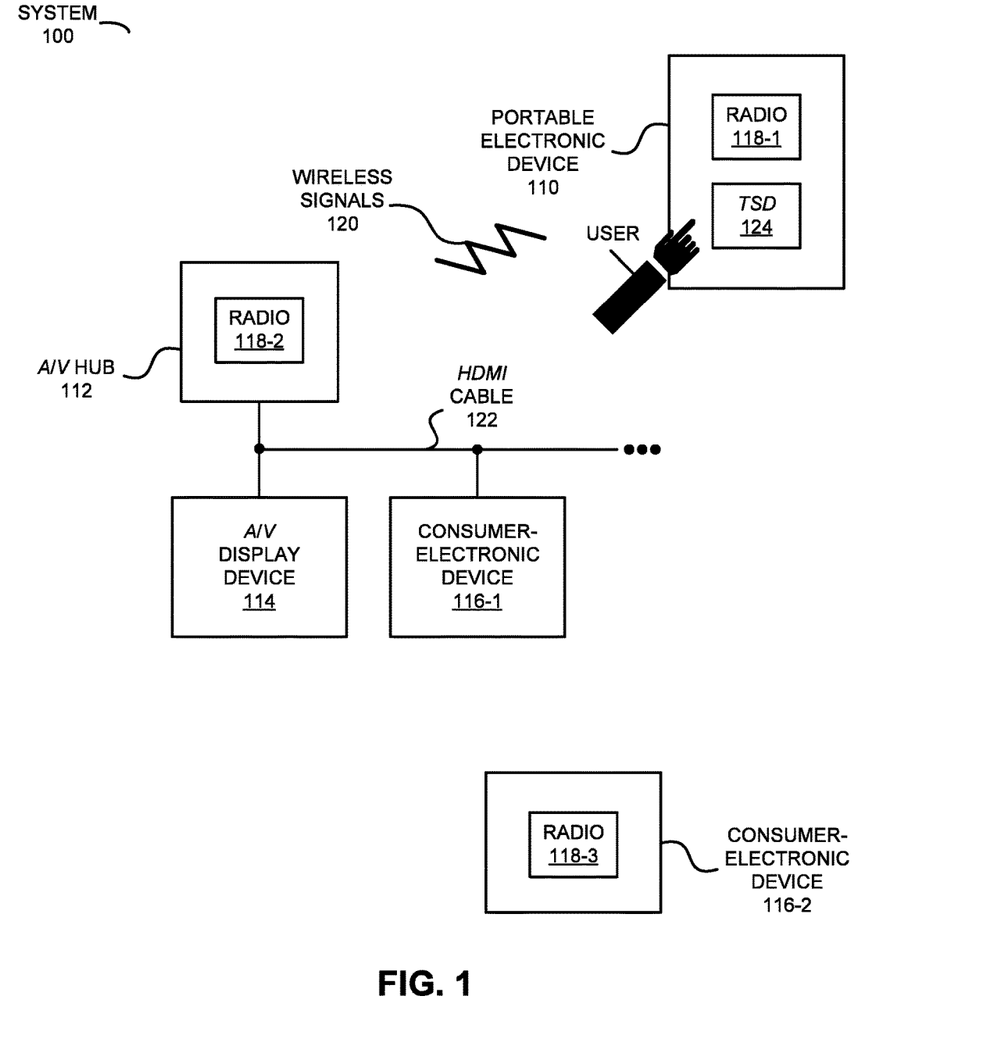
FIG. 1 is a block diagram illustrating a system with electronic devices wirelessly communicating in accordance with an embodiment of the present disclosure.

Communication among electronic devices is shown in FIG. 1, which presents a block diagram illustrating a system 100 with a portable electronic device 110 (such as a remote control or a cellular telephone), an A/V hub 112, A/V display device 114 (such as a television, a monitor, a computer and, more generally, a display associated with an electronic device) and one or more consumer-electronic devices 116 (e.g., a radio receiver, a video player, a satellite receiver, an access point that provides a connection to a wired network such as the Internet, a media or a content source, a consumer-electronic device, a set-top box, over-the-top content delivered over the Internet or a network without involvement of a cable, satellite or multiple-system operator, etc.). (Note that A/V hub 112, A/V display device 114, and the one or more consumer-electronic devices 116 are sometimes collectively referred to as 'components' in system 100.) In particular, portable electronic device 110 and A/V hub 112 may communicate with each other using wireless communication, and A/V hub 112 and other components in system 100 (such as A/V display device 114 and the one or more consumer-electronic devices 116) may communicate using wireless and/or wired communication. (Thus, portable electronic device 110 may communicate with A/V display device 114 and the one or more consumer-electronic devices 116 that may be remotely located, such as in another room or that are not within line of sight, and which may or may not be connected by high-definition multimedia-interface (HDMI) cable 122.) During the wireless communication, these electronic devices may wirelessly communicate while: transmitting advertising frames on wireless channels, detecting one another by scanning wireless channels, establishing connections (for example, by transmitting association requests), and/or transmitting and receiving packets or frames (which may include the association requests and/or additional information as payloads, such as user-interface information, device-state information, user-interface activity information, data, A/V content, etc.).

Figure 5:
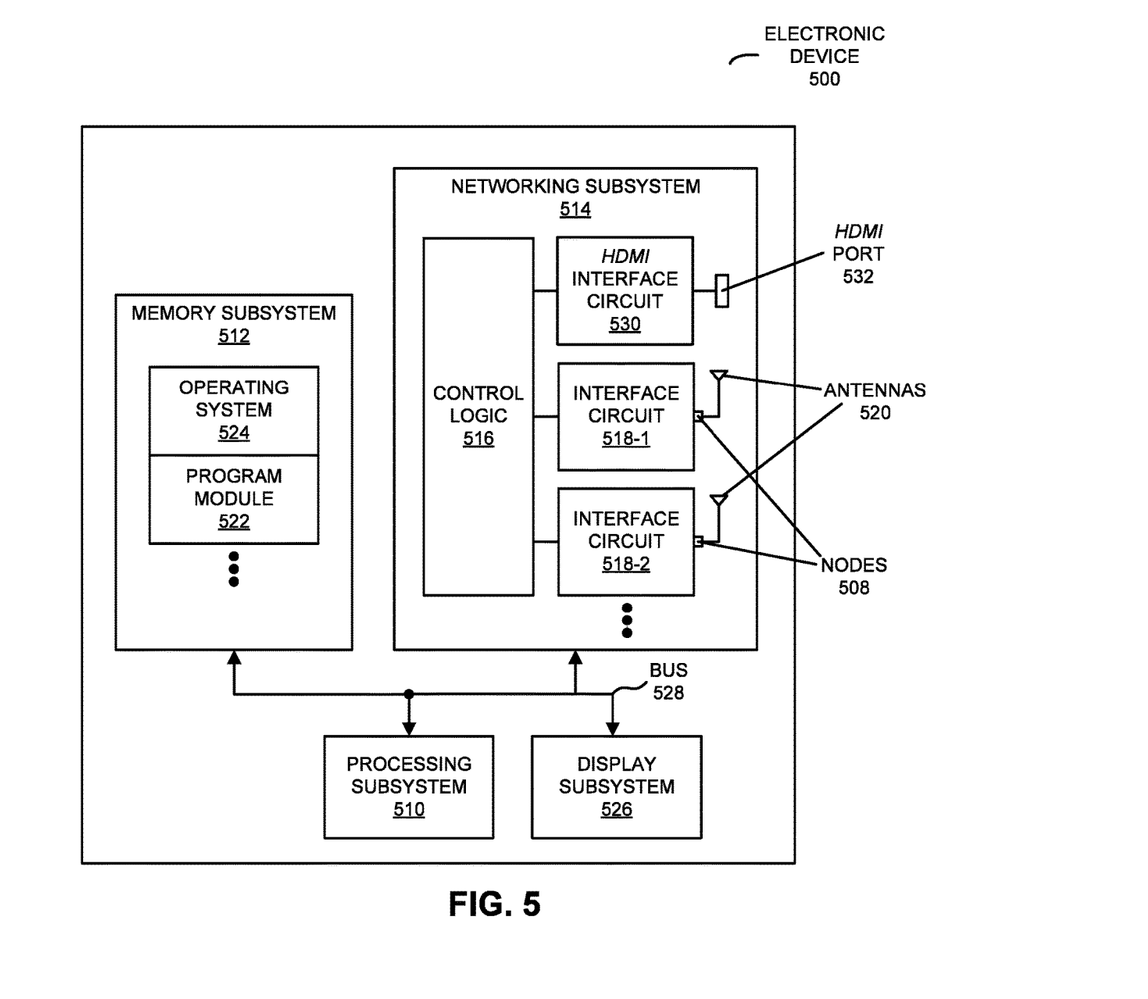
FIG. 5 is a block diagram illustrating one of the electronic devices of FIG. 1 in accordance with an embodiment of the present disclosure.

As described further below with reference to FIG. 5, portable electronic device 110, A/V hub 112, A/V display device 114 and the one or more consumer-electronic devices 116 may include subsystems, such as: a networking subsystem, a memory subsystem and a processor subsystem. In addition, portable electronic device 110 and A/V hub 112, and optionally one or more of A/V display device 114 and/or the one or more consumer-electronic devices 116, may include radios 118 in the networking subsystems. (Note that radios 118 may be instances of the same radio or may be different from each other.) More generally, portable electronic device 110 and A/V hub 112 (and optionally one or more of A/V display device 114 and/or the one or more consumer-electronic devices 116) can include (or can be included within) any electronic devices with the networking subsystems that enable portable electronic device 110 and A/V hub 112 (and optionally one or more of A/V display device 114 and/or the one or more consumer-electronic devices 116) to wirelessly communicate with each other. This wireless communication can comprise transmitting advertisements on wireless channels to enable electronic devices to make initial contact or detect each other, followed by exchanging subsequent data/management frames (such as association requests and responses) to establish a connection, configure security options (e.g., Internet Protocol Security), transmit and receive packets or frames via the connection, etc.

As can be seen in FIG. 1, wireless signals 120 (represented by a jagged line) are transmitted from radio 118-1 in portable electronic device 110. These wireless signals are received by at least A/V hub 112. In particular, portable electronic device 110 may transmit packets. In turn, these packets may be received by a radio 118-2 in A/V hub 112. This may allow portable electronic device 110 to communicate information to A/V hub 112. While FIG. 1 illustrates portable electronic device 110 transmitting packets, note that portable electronic device 110 may also receive packets from A/V hub 112.

In the described embodiments, processing of a packet or frame in portable electronic device 110 and A/V hub 112 (and optionally one or more of A/V display device 114 and/or the one or more consumer-electronic devices 116) includes: receiving wireless signals 120 with the packet or frame; decoding/extracting the packet or frame from received wireless signals 120 to acquire the packet or frame; and processing the packet or frame to determine information contained in the packet or frame (such as the information associated with a data stream). For example, the information from portable electronic device 110 may include user-interface activity information associated with a user interface displayed on touch-sensitive display 124 in portable electronic device 110, which a user of portable electronic device 110 uses to control A/V hub 112, A/V display device 114 and/or one of the one or more consumer-electronic devices 116. Alternatively, the information from A/V hub 112 may include device-state information about a current device state of A/V display device 114 or one of the one or more consumer-electronic devices 116 (such as on, off, play, rewind, fast forward, a selected channel, selected content, a content source, etc.), or may include user-interface information for the user interface (which may be dynamically updated based on the device-state information and/or the user-interface activity information). (Note that A/V hub 112 may determine the device-state information even for legacy entertainment devices that are only capable of receiving commands or instructions, i.e., that are only capable of unidirectional communication.) Furthermore, the information from A/V hub 112 and/or one of the one or more consumer-electronic devices 116 may include audio and video that are displayed on A/V display device 114. (However, as noted previously, the audio and video may be communicated between components in system 100 via wired communication. Therefore, as shown in FIG. 1, there may be a wired cable or link, such as HDMI cable 122, between A/V hub 112 and A/V display device 114.)

Note that the communication between portable electronic device 110 and A/V hub 112 (and optionally one or more of A/V display device 114 and/or the one or more consumer-electronic devices 116) may be characterized by a variety of performance metrics, such as: a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a channel or link), and/or a ratio of an actual data rate to an estimated data rate (which is sometimes referred to as 'utilization'). Moreover, the performance during the communication associated with different channels may be monitored individually or jointly (e.g., to identify dropped packets).

The communication between portable electronic device 110 and A/V hub 112 (and optionally one or more of A/V display device 114 and/or the one or more consumer-electronic devices 116) in FIG. 1 may involve one or more independent, concurrent data streams in different wireless channels (or even different Wi-Fi communication protocols) in one or more connections or links, which may be communicated using multiple radios. Note that the one or more connections or links may each have a separate or different service set identifier on a wireless network in system 100 (which may be a proprietary network or a public network). Moreover, the one or more concurrent data streams may, on a dynamic or packet-by-packet basis, be partially or completely redundant to improve or maintain the performance metrics even when there are transient changes (such as interference, changes in the amount of information that needs to be communicated, movement of portable electronic device 110, etc.), and to facilitate services (while remaining compatible with the Wi-Fi communication protocol) such as: channel calibration, determining of one or more performance metrics, performing quality-of-service characterization without disrupting the communication (such as performing channel estimation, determining link quality, performing channel calibration and/or performing spectral analysis associated with at least one channel), seamless handoff between different wireless channels, coordinated communication between components, etc. These features may reduce the number of packets that are resent, and, thus, may decrease the latency and avoid disruption of the communication and may enhance the experience of one or more users or viewers of content on A/V display device 114.

As noted previously, a user may control A/V hub 112, A/V display device 114 and/or one of the one or more consumer-electronic devices 116 via the user interface displayed on touch-sensitive display 124 on portable electronic device. In particular, at a given time, the user interface may include one or more virtual icons that allow the user to activate, deactivate or change functionality or capabilities of A/V hub 112, A/V display device 114 and/or one of or more consumer-electronic devices 116. For example, a given virtual icon in the user interface may have an associated strike area on a surface of touch-sensitive display 124. If the user makes and then breaks contact with the surface (e.g., using one or more fingers or digits, or using a stylus) within the strike area, portable electronic device 110 (such as a processor executing a program module) may receive user-interface activity information indicating this command or instruction from a touch-screen input/output (I/O) controller, which is coupled to touch-sensitive display 124. (Alternatively, touch-sensitive display 124 may be responsive to pressure. In these embodiments, the user may maintain contact with touch-sensitive display 124 with an average contact pressure that is usually less than a threshold value, such as 10-20 kPa, and may activate a given virtual icon by increase the average contact pressure with touch-sensitive display 124 above the threshold value.) In response, the program module may instruct an interface circuit in portable electronic device 110 to wirelessly communicate the user-interface activity information indicating this command or instruction to A/V hub 112, and A/V hub 112 may communicate the command or the instruction to the target component in system 100 (such as A/V display device 114). This instruction or command may result in A/V display device 114 turning on or off, displaying content from a particular source, performing a trick mode of operation (such as fast forward or rewind), etc.

However, one problem with using portable electronic device 110 as a remote control for another component in system 100 is that the surface of touch-sensitive display 124 may lack tactile or haptic clues (such as roughness or changes in the topography) that the user can use to navigate through the virtual icons in the user interface just by touching touch-sensitive display 124 (e.g., even when the user is not looking at the user interface or when the user cannot look at the user interface, such as when the lighting is poor or when portable electronic device 110 is hidden under a blanket, etc.). This is in contrast with many existing remote controls, which have physical buttons and features that allow the user to use haptic perception to feel when their finger is above a button or, even, to feel when their finger is above a particular button. Consequently, when using the user interface on portable electronic device 110, the user may be at risk for positioning their finger or digit (or a stylus) over the wrong virtual icon, or the user may be at risk for mis-positioning their finger or digit (or a stylus) relative to the strike area of a given virtual icon. These errors or mistakes may frustrate the user, thereby degrading their user experience when using components in system 100, such as A/V hub 112, A/V display device 114 and/or one of the one or more consumer-electronic devices 116.

In order to address this problem, after receiving the user-interface activity information (such as information specifying the location of a current, ongoing touch contact point of the user or a stylus with the surface of touch-sensitive display 124), A/V hub 112 (such as a processor executing a program module) may generate visual feedback based on the user-interface activity information. Then, A/V hub 112 may provide, via an interface circuit in A/V hub 112, visual feedback to A/V display device 114 for display on a display in A/V display device 114. (In some embodiments, A/V hub 112 displays the visual feedback on A/V display device 114.) As described below with reference to FIG. 4, the visual feedback may indicate a position of at least the touch contact point of the user of portable electronic device 110 relative to the strike area of at least one of the virtual command icons in the user interface. For example, A/V display device 114 may display the visual feedback on the display along with content, such as A/V content that is generated by A/V hub 112 and/or one of the one or more consumer-electronic devices 116. In particular, the visual feedback may be superimposed on or over the A/V content. Moreover, the visual feedback may be partially transparent so that the A/V content is visible underneath the visual feedback when displayed on A/V display device 114. In an exemplary embodiment, the visual feedback may include spatial information or graphical information that summarizes the current spatial configuration of the user interface (including one or more virtual icons, their functions and/or the associated strike areas) and the relative position of the touch contact point. Note that visual feedback that is superimposed on or over the A/V content may be context based. For example, the visual feedback may depend upon or may be based on the electronic devices that are connected or coupled to A/V hub 112.

In this way, the user may be provided intuitive situational awareness about their position in the user interface as the user moves their finger or digit (or a stylus) around the surface of the touch-sensitive display while maintaining contact with the touch-sensitive display. Once the user has successfully navigated to a desired virtual icon, the user may release or break contact with the touch-sensitive display, so that the user-interface activity information includes an associated command or instruction for one of the components in system 100.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames. While portable electronic device 110 and A/V hub 112 are illustrated with a single instance of radios 118, in other embodiments portable electronic device 110 and A/V hub 112 (and optionally one or more of A/V display device 114 and/or the one or more consumer-electronic devices 116) may include multiple radios.

Figure 2:
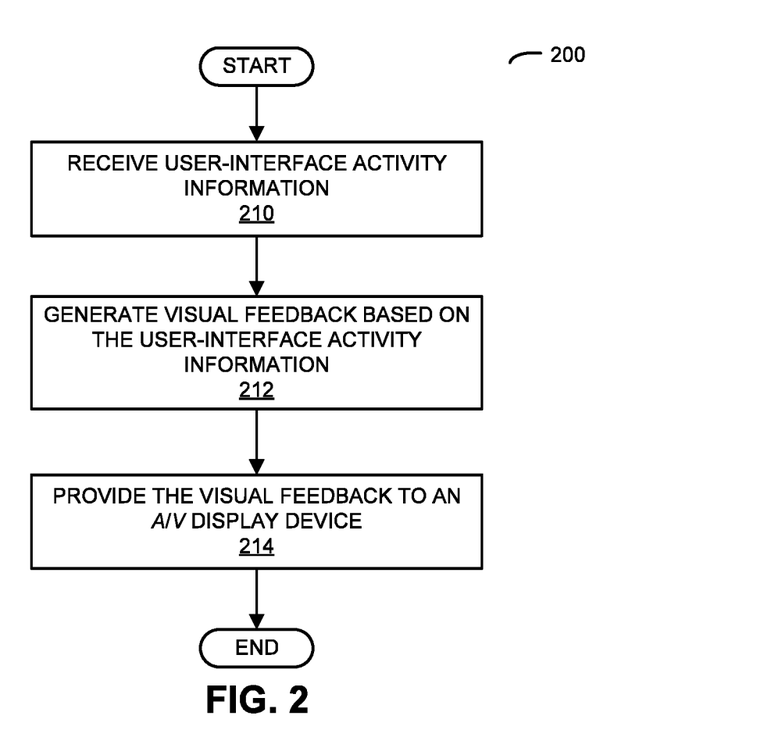
FIG. 2 is a flow diagram illustrating a method for providing visual feedback in accordance with an embodiment of the present disclosure.

FIG. 2 presents embodiments of a flow diagram illustrating method 200 for providing visual feedback, which may be performed by an A/V hub, such as A/V hub 112 (FIG. 1). During operation, the A/V hub receives, via an interface circuit in the A/V hub, user-interface activity information (operation 210) from a portable electronic device, where the user-interface activity information is associated with a user interface displayed on a touch-sensitive display in the portable electronic device, and the user interface is used to control one of an A/V display device, the A/V hub and a consumer-electronic device, which is other than the portable electronic device. Then, the A/V hub generates the visual feedback based on the user-interface activity information (operation 212). Next, the A/V hub provides the visual feedback to the A/V display device (operation 214) for display on a display in the A/V display device, where the visual feedback indicates a relative position of at least a touch contact point of a user of the portable electronic device relative to a strike area of at least a virtual command icon in the user interface.

In these ways, the A/V hub (for example, software executed in an environment of the A/V hub, such as an operating system) may facilitate the visual feedback to the user of the portable electronic device. This visual feedback may allow the user to navigate through the user interface without the user looking at the user interface. Consequently, method 200 may reduce user errors or mistakes when using the user interface, which may improve the user experience when using the portable electronic device.

In some embodiments of method 200 (FIG. 2), there may be additional or fewer operations. For example, the A/V hub may display the visual feedback on the A/V display device. Moreover, the order of the operations may be changed, and/or two or more operations may be combined into a single operation.

Figure 3:
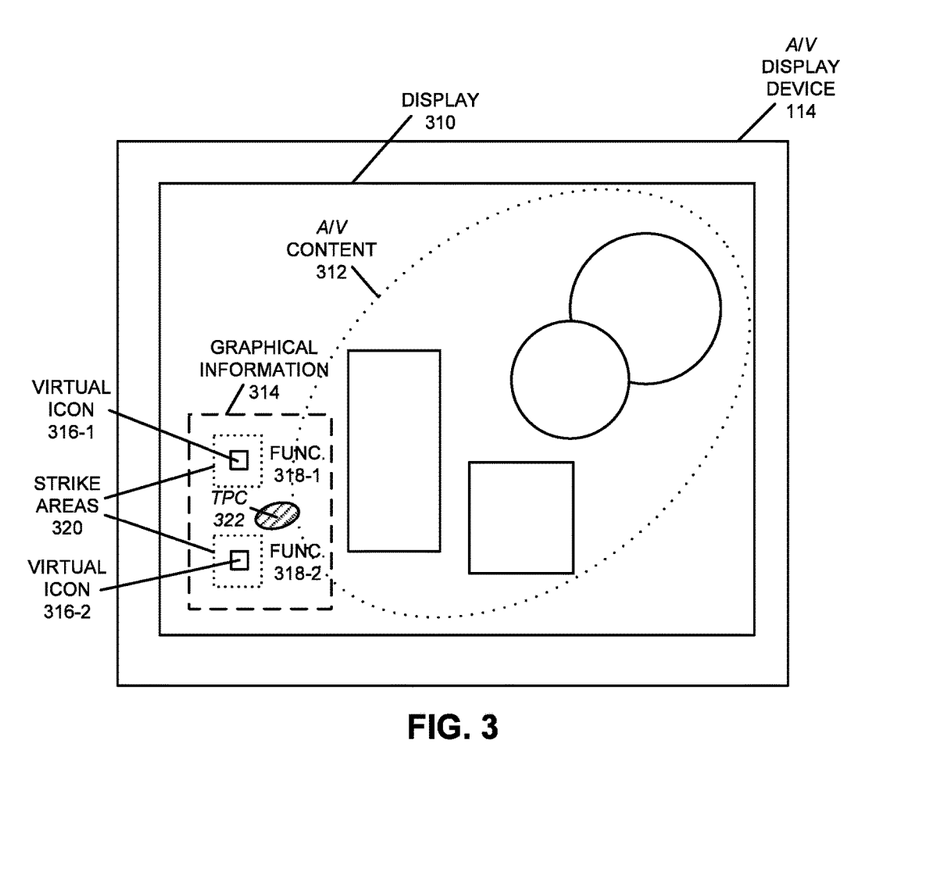
FIG. 3 is a block diagram illustrating visual feedback on an audio/video (A/V) display device in accordance with an embodiment of the present disclosure.

FIG. 3 presents a block diagram illustrating visual feedback on an A/V display device, such as A/V display device 114. In particular, a display 310 in A/V display device 114 may present or display content, such as A/V content 312.

In addition, display 310 may present or display the visual feedback that is received from A/V hub 112 (FIG. 1). As shown in FIG. 1, the visual feedback may include object or graphical information 314 that summarizes the current spatial configuration of a user interface on a touch-sensitive display in a portable electronic device. This graphical information may include representations of: one or more virtual icons 316, functions 318 of the one or more virtual icons 316 and/or strike areas 320 associated with the one or more virtual icons 316. In addition, graphical information 314 may indicate a relative or absolute position of a current touch contact point (TPC) 322 of a user of the portable electronic device with the touch-sensitive display.

When the user activates a given one of the one or more virtual icons 316 (such as virtual icon 316-1) by touching the surface of the touch-sensitive display with a strike area of virtual icon 316-1 (which may have a larger area, a smaller area or an equivalent area as virtual icon 316-1, so that the strike area can be between a portion of and the entire area of the touch-sensitive display) and then breaking contact with the surface of the touch-sensitive display, virtual icon 316-1 may be shown in bold (e.g., with a different line thickness), in a different color and/or flashed in graphical information 314. Similarly, when the user deactivates the given one of the one or more virtual icons 316 (such as virtual icon 316-1) by touching the surface of the touch-sensitive display with the strike area of virtual icon 316-1 again and then breaking contact with the surface of the touch-sensitive display, the display of virtual icon 316-1 may revert to its original format (such as a default line-segment thickness, no flashing, etc.) in graphical information 314. Furthermore, as the user moves their touch contact point on the surface of the touch-sensitive display, the user-activity information communicated by the portable electronic device to the A/V hub may be updated, so that the A/V hub can accordingly update the visual feedback (such as graphical information 314) that is provided to A/V display device 114 and which is displayed on display 310. In this way, A/V display device 114 can dynamically update the visual feedback presented to the user. In some embodiments, if the user has not made contact with the surface of the touch-sensitive display for more than a predefined time interval (such as 5, 10 or 30 s), graphical information 314 is no longer displayed on display 310. This fade out (as well as a subsequent fade in) may be a sharp or sudden transition (such as in one frame or screen refresh) or made involve a slow transition over 1-2 s, during which the luminance or greyscale of graphical information 314 is progressively increased (or decreased).

Graphical information 314 may be superimposed on or over A/V content 312. In some embodiments, graphical information 314 is partially transparent so that A/V content 312 is visible underneath graphical information 314 when displayed on display 310.

Note that a wide variety of display types may be used in A/V display device 114, including: a two-dimensional display, a three-dimensional display (such as a holographic display or a volumetric display), a head-mounted display, a retinal-image projector, a heads-up display, a cathode ray tube, a liquid-crystal display, a projection display, an electroluminescent display, a display based on electronic paper, a thin-film transistor display, a high-performance addressing display, an organic light-emitting diode display, a surface-conduction electronic-emitter display, a laser display, a carbon-nanotube display, a quantum-dot display, an interferometric modulator display, a multi-touch touchscreen (which is sometimes referred to as a touch-sensitive display), and/or a display based on another type of display technology or physical phenomenon. Thus, display 310 may be portable or at a fixed location.

Figure 4:
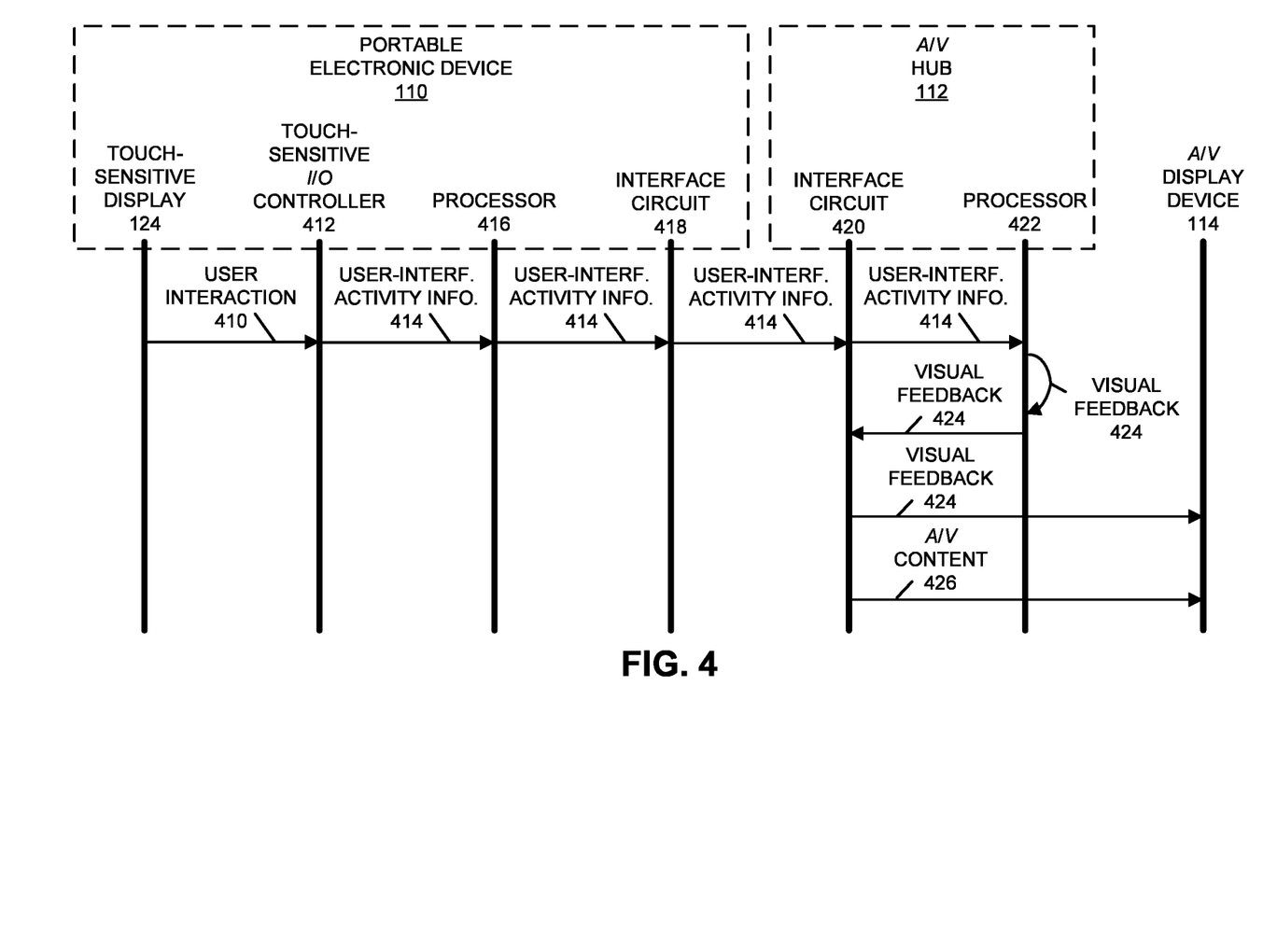
FIG. 4 is a drawing illustrating communication among the electronic devices in FIG. 1 in accordance with an embodiment of the present disclosure.

Embodiments of the feedback technique are further illustrated in FIG. 4, which presents a drawing illustrating communication between portable electronic device 110 and A/V hub 112. In particular, while a user is using portable electronic device 110, touch-screen I/O controller 412 may provide user-interface activity information 414 to processor 416 based on user interaction 410 with touch-sensitive display (TSD 124), such as: the user making or breaking contact with a surface of touch-sensitive display 124, moving a touch contact point on the surface, etc. Then, processor 416 may instruct interface circuit 418 to communicate user-interface activity information 414 to A/V hub 112.

After interface circuit 420 in A/V hub 112 receives user-interface activity information 414, processor 422 may generate visual feedback 424 based on user-interface activity information 414. For example, user-interface activity information 414 may specify a location of a touch contact point on touch-sensitive display 124, the layout and functions of one or more virtual command icons in the user interface, and/or may include an instruction or a command to activate or deactivate one or more functions of at least one of the components in system 100 (FIG. 1). Based on this user-interface activity information, processor 422 may generate instructions for an object or graphical information that includes or specifies visual feedback 424, such as a partially transparent graphical overlay that can be displayed on A/V display device 114. Note that the graphical information may include display-specific information, such as: a location where the graphical information is to be displayed on a display having a particular type, display size, and/or an aspect ratio or geometry, e.g., an aspect ratio of 16:9 with a display diagonal of at least 50 in. (These values are for purposes of illustration only, and a wide variety of display sizes, aspect ratios and types may be used in A/V display device 114.) Furthermore, generating visual feedback 424 may involve calculating a two or three-dimensional model (such as a model of the virtual icons in the user interface) and/or rendering operations, such as: two or three-dimensional projection, ray tracing, shading, coloring, texturing, illumination effects, texture mapping, and/or anti-aliasing. In the case of a three-dimensional display in A/V display device 114, the rendering operations may include calculating one or more images that include or represent: image parallax, motion parallax (based on motion of the user relative to A/V display device 114) and/or prehension (which may allow the user to perceive three-dimensional tactile or haptic interaction with objects).

Processor 422 may then instruct interface circuit 420 (or another interface circuit) to provide visual feedback 424 and/or A/V content 426 (which may be generated by A/V hub 112 and/or received from another component in system 100 in FIG. 1) to A/V display device 114 for display to the user of portable electronic device 110, thereby assisting the user in intuitively using the user interface displayed on touch-sensitive display 124.

We now describe embodiments of an electronic device. FIG. 5 presents a block diagram illustrating an electronic device 500, such as portable electronic device 110, A/V hub 112 or A/V display device 114 in FIG. 1. This electronic device includes processing subsystem 510, memory subsystem 512, and networking subsystem 514. Processing subsystem 510 includes one or more devices configured to perform computational operations. For example, processing subsystem 510 can include one or more microprocessors, application-specific integrated circuits (ASICs), microcontrollers, programmable-logic devices, and/or one or more digital signal processors (DSPs). One or more of these components in processing subsystem are sometimes referred to as a 'control mechanism' or a 'control circuit.'

Memory subsystem 512 includes one or more devices for storing data and/or instructions for processing subsystem 510 and networking subsystem 514. For example, memory subsystem 512 can include dynamic random access memory (DRAM), static random access memory (SRAM), and/or other types of memory. In some embodiments, instructions for processing subsystem 510 in memory subsystem 512 include: one or more program modules or sets of instructions (such as program module 522 or operating system 524), which may be executed by processing subsystem 510. Note that the one or more computer programs may constitute a computer-program mechanism. Moreover, instructions in the various modules in memory subsystem 512 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 510.

In addition, memory subsystem 512 can include mechanisms for controlling access to the memory. In some embodiments, memory subsystem 512 includes a memory hierarchy that comprises one or more caches coupled to a memory in electronic device 500. In some of these embodiments, one or more of the caches is located in processing subsystem 510.

In some embodiments, memory subsystem 512 is coupled to one or more high-capacity mass-storage devices (not shown). For example, memory subsystem 512 can be coupled to a magnetic or optical drive, a solid-state drive, or another type of mass-storage device. In these embodiments, memory subsystem 512 can be used by electronic device 500 as fast-access storage for often-used data, while the mass-storage device is used to store less frequently used data.

Networking subsystem 514 includes one or more devices configured to couple to and communicate on a wired and/or wireless network (i.e., to perform network operations), including: control logic 516, interface circuits 518 and associated antennas 520. (While FIG. 5 includes antennas 520, in some embodiments electronic device 500 includes one or more nodes, such as nodes 508, e.g., pads, which can be coupled to antennas 520. Thus, electronic device 500 may or may not include antennas 520.) For example, networking subsystem 514 can include a Bluetooth networking system, a cellular networking system (e.g., a 3G/4G network such as UMTS, LTE, etc.), a universal serial bus (USB) networking system, a networking system based on the standards described in IEEE 802.11 (e.g., a Wi-Fi networking system), an Ethernet networking system, and/or another networking system. Note that the combination of a given one of interface circuits 518 and at least one of antennas 520 may constitute a radio. In some embodiments, networking subsystem 514 includes a wired interface, such as HDMI interface 530.

Networking subsystem 514 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 500 may use the mechanisms in networking subsystem 514 for performing simple wireless communication between the electronic devices, e.g., transmitting advertising or beacon frames and/or scanning for advertising frames transmitted by other electronic devices as described previously.

Within electronic device 500, processing subsystem 510, memory subsystem 512, and networking subsystem 514 are coupled together using bus 528. Bus 528 may include an electrical, optical, and/or electro-optical connection that the subsystems can use to communicate commands and data among one another. Although only one bus 528 is shown for clarity, different embodiments can include a different number or configuration of electrical, optical, and/or electro-optical connections among the subsystems.

In some embodiments, electronic device 500 includes a display subsystem 526 for displaying information on a display (such as the communication warning message), which may include a display driver, an I/O controller and the display, such as a liquid-crystal display, a multi-touch touchscreen (which is sometimes referred to as a touch-sensitive display), etc.

Electronic device 500 can be (or can be included in) any electronic device with at least one network interface. For example, electronic device 500 can be (or can be included in): a desktop computer, a laptop computer, a subnotebook/netbook, a server, a tablet computer, a smartphone, a cellular telephone, a consumer-electronic device (such as a television, a set-top box, audio equipment, video equipment, etc.), a remote control, a portable computing device, an access point, a router, a switch, communication equipment, test equipment, and/or another electronic device.

Although specific components are used to describe electronic device 500, in alternative embodiments, different components and/or subsystems may be present in electronic device 500. For example, electronic device 500 may include one or more additional processing subsystems, memory subsystems, networking subsystems, and/or display subsystems. Moreover, while one of antennas 520 is shown coupled to a given one of interface circuits 518, there may be multiple antennas coupled to the given one or instance of interface circuits 518. For example, an instance of a 3×3 radio may include three antennas. Additionally, one or more of the subsystems may not be present in electronic device 500. Furthermore, in some embodiments, electronic device 500 may include one or more additional subsystems that are not shown in FIG. 5. Also, although separate subsystems are shown in FIG. 5, in some embodiments, some or all of a given subsystem or component can be integrated into one or more of the other subsystems or component(s) in electronic device 500. For example, in some embodiments program module 522 is included in operating system 524.

Moreover, the circuits and components in electronic device 500 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 514, such as one or more radios. Moreover, the integrated circuit may include hardware and/or software mechanisms that are used for transmitting wireless signals from electronic device 500 and receiving signals at electronic device 500 from other electronic devices. Aside from the mechanisms herein described, radios are generally known in the art and hence are not described in detail. In general, networking subsystem 514 and/or the integrated circuit can include any number of radios.

In some embodiments, networking subsystem 514 and/or the integrated circuit include a configuration mechanism (such as one or more hardware and/or software mechanisms) that configures the radios to transmit and/or receive on a given channel (e.g., a given carrier frequency). For example, in some embodiments, the configuration mechanism can be used to switch the radio from monitoring and/or transmitting on a given channel to monitoring and/or transmitting on a different channel. (Note that 'monitoring' as used herein comprises receiving signals from other electronic devices and possibly performing one or more processing operations on the received signals, e.g., determining if the received signal comprises an advertising frame, calculating a performance metric, performing spectral analysis, etc.) Furthermore, networking subsystem 514 may include at least one port (such as an HDMI port 532) to receive and/or provide the information in the data stream to A/V display device 114 (FIG. 1) and/or one of the one or more consumer-electronic devices 116 (FIG. 1).

While a communication protocol compatible with Wi-Fi was used as an illustrative example, the described embodiments may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the feedback technique may be implemented using program module 522, operating system 524 (such as drivers for interface circuits 518) and/or in firmware in interface circuits 518. Alternatively or additionally, at least some of the operations in the feedback technique may be implemented in a physical layer, such as hardware in interface circuits 518.

Moreover, while the preceding embodiments included a touch-sensitive display in the portable electronic device that the user touches (e.g., with a finger or digit, or a stylus), in other embodiments the user interface is display on a display in the portable electronic device and the user interacts with the user interface without making contact or touching the surface of the display. For example, the user's interact(s) with the user interface may be determined using time-of-flight measurements, motion sensing (such as a Doppler measurement) or another non-contact measurement that allows the position, direction of motion and/or speed of the user's finger or digit (or a stylus) relative to position(s) of one or more virtual command icons to be determined. In these embodiments, note that the user may activate a given virtual command icon by performing a gesture (such as 'tapping' their finger in the air without making contact with the surface of the display). In some embodiments, the user navigates through the user interface and/or activates/deactivates functions of one of the components in system 100 (FIG. 1) using spoken commands or instructions (i.e., via voice recognition) and/or based on where they are looking in the visual feedback displayed on A/V display device 114 in FIG. 1 (e.g., by tracking the user's gaze or where the user is looking).

Furthermore, while A/V hub 112 (FIG. 1) was illustrated as a separate component from A/V display device 114 (FIG. 1), in some embodiments the components are combined into a single component or a single electronic device.

While the preceding embodiments illustrated the feedback technique with audio and video content, in other embodiments the feedback technique is used in the context of an arbitrary type of data or information. For example, the feedback technique may be used with home-automation data. In these embodiments, A/V hub 112 (FIG. 1) may facilitate communication among and control of a wide variety of electronic devices, including electronic devices in addition to or other than entertainment devices. Thus, A/V hub 112 (FIG. 1) and the feedback technique may be used to facilitate or implement the so-called Internet of things.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
an interface circuit; and
a control circuit, coupled to the interface circuit, which is configured to:
receive, via the interface circuit, user-interface activity information associated with a second electronic device, wherein the user-interface activity information is associated with a user interface that is associated with a touch-sensitive display in the second electronic device;
generate visual feedback based on the user-interface activity information; and
provide, via the interface circuit, the visual feedback for a display device, wherein the visual feedback indicates a position, on the touch-sensitive display, of at least a touch contact point relative to a strike area of at least a virtual command icon in the user interface when the touch contact point is outside of the strike area and other strike areas of other virtual command icons in the user interface; and
wherein an indication of the position in the visual feedback is different from the virtual command icon, the other virtual command icons, and content associated with the virtual command icon or the other virtual command icons.

2. The electronic device of claim 1, wherein the interface circuit is configured to communicate using at least one of: wireless communication, or infra-red communication.

3. The electronic device of claim 1, wherein the electronic device and the display device are included in a single electronic device.

4. The electronic device of claim 1, wherein the electronic device further comprises a second interface circuit, coupled to the control circuit, which is configured to couple to the display device.

5. The electronic device of claim 4, wherein the electronic device comprises a port, coupled to the second interface circuit, compatible with a high-definition multimedia-interface (HDMI) standard; and
wherein the port is configured to couple to the display device.

6. The electronic device of claim 1, wherein the visual feedback comprises information that specifies that the visual feedback is to be partially transparent so that content on the display device is visible underneath the visual feedback when the visual feedback is displayed on the display device.

7. The electronic device of claim 1, wherein the second electronic device comprises a cellular telephone that functions as a remote control.

8. The electronic device of claim 1, wherein at least the touch contact point is ongoing.

9. The electronic device of claim 1, wherein the user-interface activity information specifies activation of at least the virtual command icon when the at least the touch contact point is released within the strike area.

10. The electronic device of claim 1, wherein the control circuit comprises:
a processor coupled to the interface circuit; and
a memory, coupled to the processor, which stores a program module that, when executed by the processor, causes the electronic device to perform the receiving, the generating and the providing.

11. A non-transitory computer-readable storage medium for use in conjunction with an electronic device, the computer-readable storage medium storing a program module that, when executed by the electronic device, causes the electronic device to perform one or more operations comprising:
receiving, via an interface circuit in the electronic device, user-interface activity information associated with a second electronic device, wherein the interface circuit communicates using at least one of: wireless communication, or infra-red communication, and wherein the user-interface activity information is associated with a user interface that is associated with a touch-sensitive display in the second electronic device;
generating visual feedback based on the user-interface activity information; and
providing, via the interface circuit, the visual feedback for a display device, wherein the visual feedback indicates a position, on the touch-sensitive display, of at least a touch contact point relative to a strike area of at least a virtual command icon in the user interface when the touch contact point is outside of the strike area and other strike areas of other virtual command icons in the user interface; and
wherein an indication of the position in the visual feedback is different from the virtual command icon, the other virtual command icons, and content associated with the virtual command icon or the other virtual command icons.

12. The computer-readable storage medium of claim 11, wherein the visual feedback is provided, to a port, for the display device; and
wherein the port is compatible with a high-definition multimedia-interface (HDMI) standard.

13. The computer-readable storage medium of claim 11, wherein the visual feedback comprises information that specifies that the visual feedback is to be partially transparent so that content on the display device is visible underneath the visual feedback when the visual feedback is displayed on the display device.

14. The computer-readable storage medium of claim 11, wherein the electronic device and the display device are included in a single electronic device.

15. The computer-readable storage medium of claim 11, wherein the second electronic device comprises a cellular telephone that functions as a remote control.

16. The computer-readable storage medium of claim 11, wherein at least the touch contact point is ongoing.

17. The computer-readable storage medium of claim 11, wherein the user-interface activity information specifies activation of at least the virtual command icon when at least the touch contact point is released within the strike area.

18. A method for providing visual feedback, comprising:
by an electronic device:
receiving, via an interface circuit in the electronic device, user-interface activity information associated with a second electronic device, wherein the interface circuit communicates using at least one of: wireless communication, or infra-red communication, and wherein the user-interface activity information is associated with a user interface that is associated with a touch-sensitive display in the second electronic device;
generating the visual feedback based on the user-interface activity information; and
providing, via the interface circuit, the visual feedback for a display device, wherein the visual feedback indicates a relative position, on the touch-sensitive display, of at least a touch contact point relative to a strike area of at least a virtual command icon in the user interface when the touch contact point is outside of the strike area and other strike areas of other virtual command icons in the user interface; and
wherein an indication of the position in the visual feedback is different from the virtual command icon, the other virtual command icons, and content associated with the virtual command icon or the other virtual command icons.

19. The method of claim 18, wherein the electronic device and the display device are included in a single electronic device.

20. The method of claim 18, wherein the second electronic device comprises a cellular telephone that functions as a remote control.

* * * * *